March 17, 1931.  J. R. JOHNSON  1,796,332
MOTOR CONTROL SYSTEM
Filed May 8, 1926
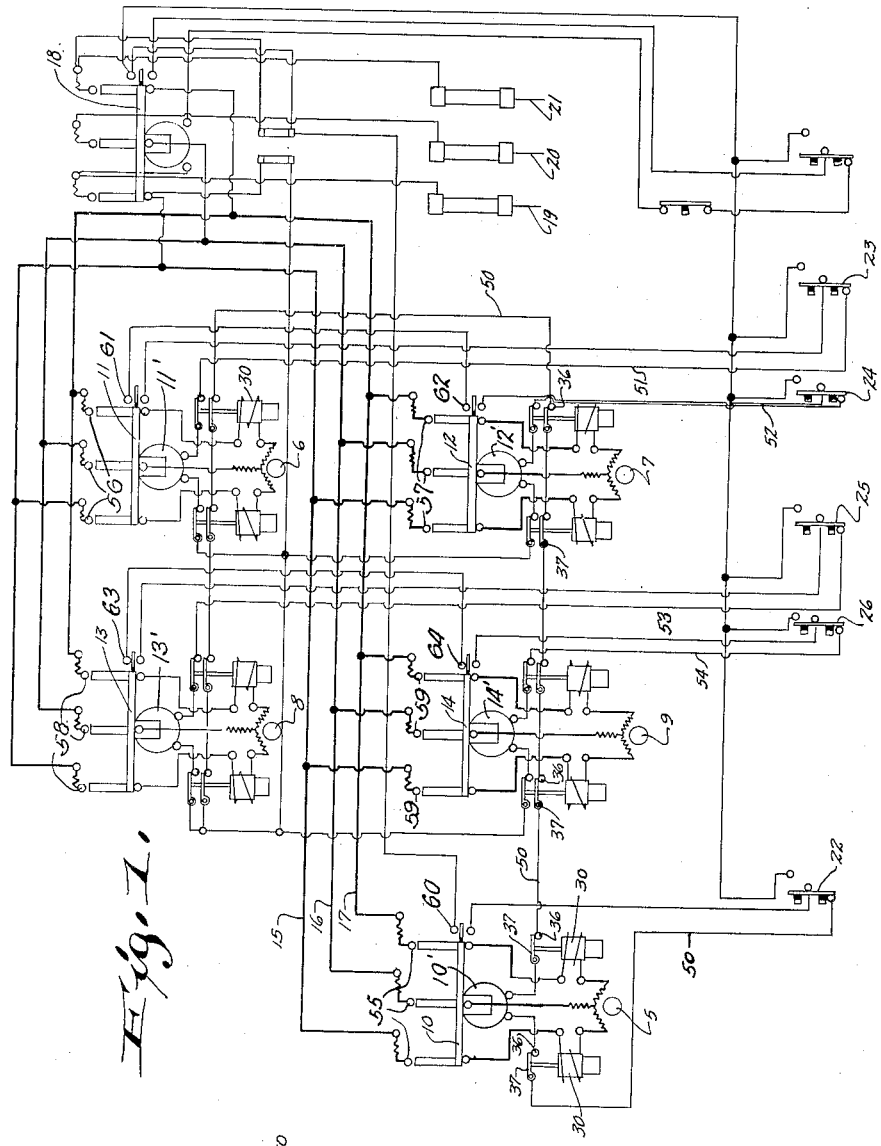

Patented Mar. 17, 1931

1,796,332

UNITED STATES PATENT OFFICE

JEWELL ROY JOHNSON, OF OSHKOSH, WISCONSIN

MOTOR-CONTROL SYSTEM

Application filed May 8, 1926. Serial No. 107,721.

This invention relates to motor control systems and more specially to a system for controlling the motors of wood working machines or machines of a similar type having a main conveyor or feed operated by one motor and a plurality of independent tools each operated by a separate motor.

In machines of this character it sometimes happens that one or more of the tool operating motors or in some instances, the feed motor itself, is overloaded to such an extent as to cause injury to the tools, the feed conveyor or to the motors themselves. It is therefore very desirable to provide some means whereby in the event of overloading, such as that described, the main feed motor will be automatically stopped, which in some instances will relieve the overload. In the event, however, that the overload is of such a nature that the stopping of the feed conveyor will not relieve it, it is then desirable to also stop the particular overloaded motors.

It is the primary object of the present invention to provide an automatic motor control system which will accomplish the desirable results above mentioned and which will at the same time be comparatively simple and easy of installation, while at the same time, being comparatively inexpensive to manufacture and maintain and quite efficient in operation.

With the above and other objects in view which will appear as the description proceeds, the invention consists in the novel details of construction and combinations and arrangements of parts more fully hereinafter described and particularly pointed out in the appended claims.

Referring to the accompanying drawings, in which like reference characters designate like parts in all the views;

Figure 1 is a diagrammatic view of the wiring and apparatus which may be employed in a wood-working or other similar machine having a feed motor and four independent tool operating motors; and, Fig. 2 is a central vertical sectional view partly in elevation of one of the automatic control switch devices.

Referring more particularly to Fig. 1, the woodworking or other machine is provided with a feed motor 5 and with the independent tool operating motors 6, 7, 8 and 9. These motors are in the present instance, diagrammatically indicated as being of the three phase alternating current type although it is obvious that if desired, they may be of any other A. C. type or of the D. C. type, inasmuch as the invention is not limited to the use of any particular type of motor. The said motors are connected in multiple through suitable switches 10, 11, 12, 13, and 14, respectively to the supply mains 15, 16, and 17, which lead from the main switch 18 controlling the supply of current from the main leads 19, 20, and 21, respectively. The motors have associated with them the starting devices 22, 23, 24, 25 and 26 respectively, which may be of any usual and well known type. The switches 10, 11, 12, 13 and 14 are of a standard type and are automatically operated by the usual magnets 10', 11', 12', 13', and 14', respectively. When the magnets are energized, the switches are automatically thrown from the "off" position shown to a position in which the contacts 55, 56, 57, 58 and 59 are engaged by the arms of the switches 10, 11, 12, 13 and 14, thereby completing the circuit to the respective motors 5, 6, 7, 8 and 9. The switches 10, 11, 12, 13 and 14 are provided with pilot switches 60, 61, 62, 63 and 64, respectively, which, when the starting devices are turned to "on" position bridge the adjacent contacts and maintain the circuit to the magnetic switches 10, 11, 12, 13 and 14 complete until said circuit is broken by turning the starting devices to "off" position or by operation of the overload devices 30 to be hereinafter described.

The means for performing the automatic cutting out of the feed motor and of the various independent tool operating motors, comprises an automatic magnetic switch device illustrated in detail in Fig. 2. By reference to the said figure, it will be seen that this device comprises a solenoid 30 mounted on a suitable support 31, and provided with a sliding core 32, which core is preferably provided with a piston 33, working in a dash pot 34 for retarding and controlling its movements. Mounted upon the support 31, above the solenoid 30 is a suitable insulating block 35 which carries a pair of contact members 36, and 37, the former of which is preferably fixed and substantially rigid with the said block but the latter is of a spring or a resilient type and so arranged that its normal tendency to bring its contact point 38 into engagement with the member 36 as shown. A plunger 39 is slidably mounted in the support 31 in alignment with the core 32 and is provided with a head 40 which is adapted to engage the resilient contact member 37 and to raise the same to break the circuit between the contact member 38 and the contact member 36 when the solenoid 30 is energized to draw the core 32 inwardly in the well known manner.

Mounted above the members just described, is a second insulating block 42 which is also provided with a pair of contact members 43 and 44, the latter of which is likewise resilient and which is provided with a contact point 45 for engaging the member 43. A plug or plunger 46 is slidably mounted in the insulating block 42 with its lower end normally spaced slightly from the upper surface of the contact member 37, so as to permit of some lost motion between the parts while the upper end of the said block is provided with a head 48 for engaging the contact member 44 to move it upwardly to break the contact between contact member 45 and member 43.

Referring again to Fig. 1, it will be noted that two of these devices are employed with each motor, their solenoids being connected in the main current supply leads 15 and 17 between the switches 10, 11, 12, 13, and 14 and the fields of the motors 5, 6, 7, 8 and 9.

In the case of the feed motor 5, the upper contacts 43 and, 44 may be omitted from the control device or if present, they are not employed, only the lower contacts 36 and 37 being necessary with this particular motor. A wire 50 leads from the starting device 22 to the contact member 37 of one of the magnetic switch devices associated with the motor 5 while the contacts of the other of the said switch devices are connected in series therewith, substantially as shown. In like manner, the contact members 37 and 36 of the other automatic switch devices are connected in series with each other and with those of the motor 5 as will be clear from Fig. 1.

Wires 51, 52, 53 and 54 lead from the starting devices 23, 24, 25 and 26, respectively to one of the contacts 43 of the automatic switch devices associated with the respective motors 6, 7, 8 and 9 which contacts will likewise be connected in series as shown.

When the starting device at the lower right-hand corner of Fig. 1 is operated current flows in through the leads 19, 20 and 21, through the closed switch 18 and into the main wires 15, 16 and 17 indicated by the heavy lines in the diagram. The current from the wires 15, 16 and 17 through the branch connections to the switches 10, 11, 12, 13 and 14 operates the motors 5, 6, 7, 8 and 9. Each of the motors may be separately controlled by the starting devices 22, 23, 24, 25 and 26. The contacts 36 and 37 of the switch devices for each motor are wired in series. When through overload on one of the tool operating motors the solenoid is operated to break the contact to the switch adjacent said motor, the said switch breaks the connection and cuts off the current to the feed motor 5. The wires connecting the contact points 36 and 37 are designated by numerals 50. The upper contacts 43 and 45 of the switch devices are each wired as shown so as to cut off the supply of current to the particular tool operating motor in case of continued overload on this motor. The circuit is of the ordinary three-wire type.

From the above description, it will be apparent that in the event of an overload upon any of the motors, such for example, as motor #6, the increased current consumed by the said motor due to such overload, will upon passing through the coils of the solenoids 30 associated therewith, cause the said solenoids to draw in the cores 32, until they contact with the lower ends of the plungers 39 and will force the said plungers up to cause the heads 40 to move their resilient contact members 37 to break the circuit between the contact member 36 and the contact points 38. The breaking of this circuit in the wire 50 also breaks the circuit to the magnet 10', causing the switch 10 to be opened and cutting off the supply of current to the feed motor 5 to stop the said motor. If the overload upon the motor such as 6, is only momentary, as soon as the current in the coils of the solenoid and the field coils of the motor returns to normal, the coil 32 of the solenoid will drop back, whereupon the feed motor circuit will be again completed, but said motor will not be again started until the switch controlling the same is operated. When said switch is turned to "on" position the magnet 10' is energized and the switch 10 is automatically closed, the contacts of the pilot switch 60 being at the same time bridged to maintain the circuit to the motor 5 complete until it is broken by the overload device 30 or by turning of the switch 22 to the "off" position.

On the other hand, should the overload on the independent tool operating motor, such as 6, be sustained so as to cause an excess current to continue to flow through the solenoids 30, of its automatic switch, the cores 32 thereof will be further raised to such an extent that the contact member 37 will be brought into engagement with the lower end of the plug or plunger 46 and will cause it in turn to break the circuit between the contact members 43 and the contact points 45. This circuit it will be noted, controls the magnet of the switch 11, 12, 13 or 14 of the particular motor with which the automatic switch is associated so that in the event of continued overloading, this particular motor will be cut out automatically. But it should be noted that the main feed motor is always stopped in advance of the stopping of the tool motor.

It is, of course, to be understood that the solenoids 30 are so constructed that when the normal amount of current consumed by the particular motor such as 6, is flowing through them, they will not be energized sufficiently to raise their cores 32 and break the various circuits above described but that when an excess amount of current is drawn by the particular motor with which they are associated that such excess current will increase the magnetism to such an extent that the cores will be lifted and the circuits broken.

While one form of the invention has been illustrated and described, it is obvious that those skilled in the art may vary the details of construction as well as the precise arrangements of parts without departing from the spirit of the invention and it is, therefore, not wished to be limited to the above disclosure, except as may be required by the claims.

What is claimed is:

1. In a motor control system of the class described, a plurality of independent tool-operating motors; a feed motor; means for supplying current to all of said motors; and means associated with each of said tool operating motors adapted in case of overload thereon, to first cut off the current supply to said feed motor, and in the event of continued overload, to subsequently cut off the current supply to such overloaded motor.

2. In a motor control system of the class described, a plurality of independent tool-operating motors; a feed motor; means for supplying current to all of said motors; and means associated with each of said motors adapted in case of overload thereon, to first cut off the current supply to said feed motor, the cut off means associated with said tool-operating motors being further adapted in the event of sustained overload thereon to subsequently cut off the current supply to such overloaded motor.

3. In a motor control system of the class described, a tool-operating motor; a feed motor; means for supplying current to said motors; and an electromagnetic switch associated with each of said motors, the coils of said switches being in circuit with their respective motors, and each switch having a set of contacts, said sets being connected in series in said feed motor circuit, whereby in the event of an overload on either of said motors, said feed motor circuit will be first broken, the switch associated with said tool operating motor being provided with an additional set of contacts in circuit with said motor, whereby in the event of continued overload on such motor, its circuit will also be broken.

4. The combination with a plurality of motors of means responsive to a sustained individual overload in one of said motors for cutting out of operation another of said motors and means dependent on a continuation of said overload for a substantial time interval after said second motor has been cut out for cutting out of operation said first motor.

5. The combination with a plurality of motors, including a motor on which a load is adapted to be imposed by the operation of a second motor, of a device responsive to a sustained individual overload in said first motor for cutting out of operation said second motor only and delayed action-means for additionally cutting out of operation said first motor on the continuation of said overload for a substantial time interval following the cutting out of operation said second motor.

6. The combination with a plurality of motors, including a motor on which a load is adapted to be imposed by the operation of a second motor, a relatively quick-acting switch responsively actuated by sustained overload in said first motor for cutting out of operation said second motor only and a relatively delayed-action switch, also responsive to sustained overload in said first motor, for cutting out of operation said first motor on continuation of said overload for a time interval following the cutting out of operation of said second motor.

7. The combination with a plurality of motors, including a motor on which a load is adapted to be imposed by the operation of a second motor, means responsive to a sustained overload in said first motor, a relatively quick-acting switch actuated by said overload-responsive means for said first motor for cutting out of operation said second motor only, and a delayed-action switch, also actuated by said overload-responsive means in said first motor, for cutting out of operation said first motor on continuation of said overload for a time interval following the cutting out of operation of said second motor.

8. The combination with a plurality of motors, of magnetically-operated, line-switches and switch-controlling circuits therefor, means responsive to an overload in one of said motors, a relatively, quick-acting switch actuated by said overload-responsive means for said first motor for acting through the line-switch-controlling circuit for a second motor to cut out of operation said second motor only and a delayed-action switch, also actuated by said overload-responsive means for said first motor to act through the line-switch-controlling circuit therefor to open the line-switch for said first motor and cut the same out of operation on continuation of said overload for a time interval following the cutting out of operation of said second motor.

9. The combination with a group of motors including a plurality of motors on which a load is adapted to be imposed by another motor, of overload switches in the circuit of each of said plurality of motors, means for automatically cutting out of operation said other motor on the opening of the overload switch for any one of said plurality of motors while continuing the operation of said overloaded motor and means for thereafter cutting out of operation said overloaded motor on the continuation of said overload for a substantial interval of time after said other motor has been cut out of operation.

10. The combination with a group of motors including a feed motor and a plurality of work motors on which a load is adapted to be imposed by the operation of the feed motor, of means responsive to a sustained individual overload in any one of said work motors for cutting out of operation the feed motor only while continuing the operation of the overloaded work motor and means for automatically cutting out of operation the overloaded work motor on the continuation of said overload for a substantial time interval after the feed motor has been cut out of operation.

11. The combination with a plurality of motors of means responsive to an overload in one of said motors for cutting out of operation the said motor only, means responsive to an overload in another of said motors for cutting out of operation also said first motor only, and means dependent on a continuation of the overload in said second motor after said first motor has been cut out for cutting out of operation said second motor.

In testimony whereof, I affix my signature.

J. ROY JOHNSON.